(12) United States Patent  (10) Patent No.: US 7,597,834 B2
DeSimone  (45) Date of Patent: Oct. 6, 2009

(54) ROTARY MOLDING MACHINE

(75) Inventor: John DeSimone, Woodbridge (CA)

(73) Assignee: Husky Injection Molding Systems Ltd., Bolton, ON (CA)

(*) Notice: Subject to any disclaimer, the term of this patent is extended or adjusted under 35 U.S.C. 154(b) by 188 days.

(21) Appl. No.: 11/733,638

(22) Filed: Apr. 10, 2007

(65) Prior Publication Data

US 2008/0251974 A1  Oct. 16, 2008

(51) Int. Cl.
    *B29C 45/06*  (2006.01)
(52) U.S. Cl. .................. 264/297.3; 425/576; 425/588
(58) Field of Classification Search ............. 425/540, 425/576, 577, 588, 589, 594, 595; B29C 45/06
    See application file for complete search history.

(56) References Cited

U.S. PATENT DOCUMENTS

| | | | | |
|---|---|---|---|---|
| 3,302,243 A | * | 2/1967 | Ludwig | 425/453 |
| 3,337,912 A | * | 8/1967 | Di Settembrini | 425/532 |
| 3,345,687 A | * | 10/1967 | Marx | 425/555 |
| 3,730,665 A | * | 5/1973 | Fortin et al. | 425/259 |
| 3,833,329 A | | 9/1974 | Ulmachneider | |
| 3,918,864 A | | 11/1975 | Braun | |
| 4,080,148 A | | 3/1978 | Wise | |
| 4,424,015 A | * | 1/1984 | Black et al. | 425/138 |
| 4,726,757 A | * | 2/1988 | Berry | 425/574 |
| 5,028,226 A | | 7/1991 | De'ath et al. | |
| 5,435,715 A | * | 7/1995 | Campbell | 425/576 |
| 5,643,620 A | | 7/1997 | Brun | |
| 5,855,935 A | * | 1/1999 | Brent et al. | 425/574 |
| 6,179,605 B1 | * | 1/2001 | Littleton et al. | 425/547 |

* cited by examiner

*Primary Examiner*—Joseph S. Del Sole
*Assistant Examiner*—James Sanders

(57) ABSTRACT

Disclosed, amongst other things, is: (i) a rotary injection molding machine; (ii) a mold; (iii) a mass-drive; and (iv) a method of a molding, amongst other things.

72 Claims, 1 Drawing Sheet

ROTARY MOLDING MACHINE

TECHNICAL FIELD

The present invention generally relates to, but is not limited to, molding machines, and more specifically the present invention relates to, but is not limited to, a rotary molding machine, a mold, a mass-drive, and a method of a molding, amongst other things.

BACKGROUND

U.S. Pat. No. 3,833,329 (Inventor: ULMACHNEIDER, Lawrence, A., Published: 3 Sept. 1974) describes a continuous injection molding system that includes a rotatable rotor member having a plurality of mold assemblies disposed about the periphery thereof. Each mold assembly has an injection chamber and an openable mold cavity. A stationary molten plastic supply means is disposed adjacent the periphery of the rotor member and is arranged to supply for example molten thermoplastic material to the injection chamber of a mold assembly as it is continuously moved past the supply means. Each mold assembly has an injection means arranged for movement into the injection chamber after the mold assembly has moved past the supply means to inject the molten thermoplastic material in the injection chamber into the mold cavity. Means is arranged to open each of the molds after the molten material injected therein has solidified, and to close the mold after removal of the solidified material therefrom and before the mold reaches the supply means. The means to open the molds and the injection means include a mold lifting hydraulic cylinder and an injection ram, respectively, and corresponding operating valves which engages and are actuated by a stationary cam member as the mold assembly is rotated about the stationary base assembly.

U.S. Pat. No. 3,918,864 (Inventor: BRAUN, Dieter, B., Published: 11 Nov. 1975) describes a continuous injection molding system that includes a mold that is closed about an elongated element at a receiving location, and synthetic plastic material is introduced into the mold to injection-mold a synthetic plastic member about the element within the mold. The mold with the elongated element is advanced in a circular path until the material of the synthetic plastic member has hardened, and thereupon the mold is opened at a discharging location. The molds are closed by a pressure ram via a pressure spring as rollers roll along rails having a wavy configuration.

U.S. Pat. No. 4,080,148 (Inventor: WISE, Joseph, Published: 21 Mar. 1978) describes a continuous injection molding system that includes a rotatable wheel having molding cavities formed in the perimeter thereof. Movable coring pins are mounted on the wheel perimeter and have cam track follower means which ride in stationary cam tracks positioned adjacent the wheel and which move the coring pins in and out of said cavities as said wheel rotates.

U.S. Pat. No. 5,643,620 (Inventor: BRUN, Charles, Jr., Published: 1 Jul. 1997) describes an injection molding system for serially molding articles that includes a circular array of molds, arranged in mold clamp assemblies, and a runner system coupling an extruder output with the circular array of molds. Each clamp assembly includes separate mold actuation mechanisms. The runner system includes an accumulator chamber which is defined in part by a vertically reciprocal piston that is actuated by a hydraulic cylinder. A valve is connected between the runner system and an input leading to an accumulator chamber of each mold of the circular array for sequentially directing the plasticized resin into each of the molds to form a molded article therein. A molded article extractor sequentially removes the molded article from each of the molds, and a molded article handling apparatus coupled to the molded article extractor arranges the molded articles in a series for removal through the central area.

SUMMARY

According to a first broad aspect of the present invention, there is provided a rotary molding machine. The rotary molding machine includes a frame, a table rotatably mounted to the frame, and a first drive for rotation of the table relative to the frame. The table is configured to receive a plurality of molds mounted in a circular array thereon. The rotary molding machine further includes a hot runner mounted to the table configured to connect the plurality of molds to an extruder. The rotary molding machine further includes a mass-drive movably linked to the table for freedom of movement away from the center of rotation of the table. The mass-drive configured to drive a molding function responsive to a centrifugal force acting thereon when the table is rotated.

According to a second broad aspect of the present invention, there is provided a mold for mounting on a rotatable table of a rotary molding machine. The mold includes complementary molding structures that cooperatively define a molding cavity within which a molded article may be formed. The mold further includes a mass-drive slidably mountable on the table with freedom of movement away from the center of rotation of the table. The mass-drive is configured to clamp the complementary molding structures together responsive to a centrifugal force acting on the mass-drive.

According to a third broad aspect of the present invention, there is provided a mass-drive for a rotary molding machine. The mass-drive includes a body movably linked to a table of the rotary molding machine for freedom of movement away from a center of rotation of the table. The mass-drive configured to drive a molding function responsive to a centrifugal force directed away from the center of rotation of the table.

According to a fourth broad aspect of the present invention, there is provided a method of molding a molded article with the rotary molding machine according to the first broad aspect of the invention. The method includes the steps of rotating the table with the plurality of molds thereon, performing a first molding function of closing at least one of the plurality of molds, performing a second molding function of clamping at least one of the plurality of molds, performing a third molding function of injecting a melt into a molding cavity defined in at least one of the plurality of molds, performing a fourth molding function of opening of at least one of the plurality of molds, performing a fifth molding function of ejecting of a molded article from at least one of the plurality of molds. The method further includes performing of at least one of the molding functions with a mass-drive responsive to a centrifugal force directed away from a center of rotation of the table.

A technical effect, amongst others, of the aspects of the present invention is the provision of a rotary molding machine including a mass-drive arranged on a rotating table, and wherein the mass-drive drives a molding function responsive to a centrifugal force acting thereon when the table is rotated.

Preferable embodiments of the present invention are subject of the dependent claims.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

Figure 1:
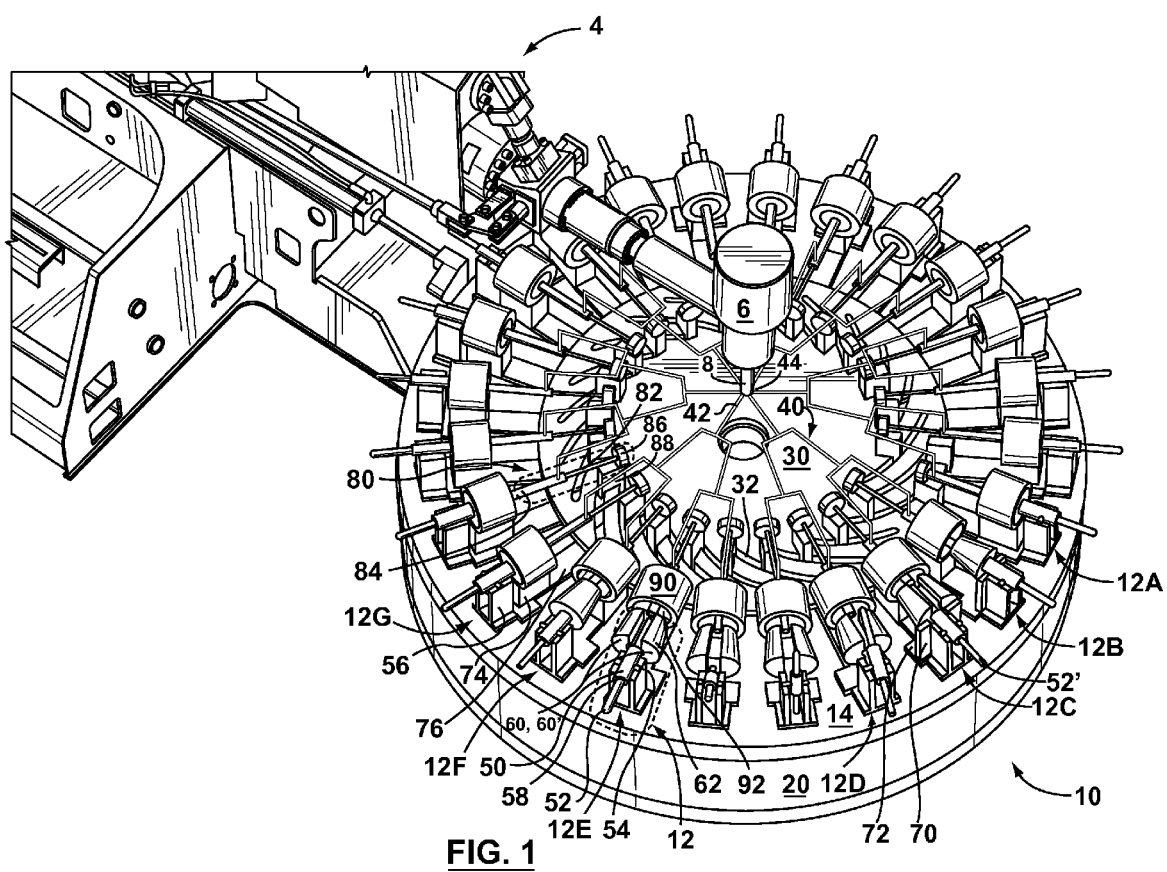
FIG. 1 is a perspective view of a rotary molding machine according to a non-limiting embodiment.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF THE EXEMPLARY EMBODIMENTS

With reference to FIG. 1, a rotary molding machine 10 in accordance with a non-limiting embodiment of the present invention is shown.

The rotary molding machine 10 includes, amongst other things, a frame 20 upon which a table 14 is rotatably mounted. The molding machine 10 also includes a hot runner 40 mounted to the table 14, a plurality of molds 12 mounted in a circular array on the table 14. The frame 20 also includes at least one drive (not shown) for rotation of the table 14.

The non-limiting embodiment further includes at least one mass-drive movably linked to the table 14 for freedom of movement away from the center of rotation of the table, as defined from a centre of rotation thereof. Preferably, but not a requirement, the freedom of movement is along a radial axis from the center of the table 14. The mass-drive configured to drive a molding function including, for example, mold clamping, or melt injection, responsive to a centrifugal force acting on the mass-drive directed away from the center of rotation of the table 14 when rotated.

Each mold 12 includes complementary molding structures that cooperatively define a molding cavity within which a molded article (not shown) may be formed. In accordance with the non-limiting embodiment the complementary molding structure includes a core 52 and a pair of split cavities 60, 60'. In particular, the core 52 defines an inner portion of the molding cavity whereas the split cavities 60, 60' together define an outer portion of the molding cavity. In accordance with the non-limiting embodiment of the present invention the molded article (not shown) is a preform of the type for blow molding into bottles. Each mold 12 further includes a lock ring 90 as will be explained in detail hereinafter. Each mold further includes a first, second, and third connecting structure each for connection to the table 14 for receiving the core 52, split cavities 60, 60', and lock ring 90, respectively. The connecting structures preferably remain with the rotary molding machine 10 whenever it is desired to replace any of the core 52, split cavities 62, 62', or lock ring 90. In accordance with an alternative non-limiting embodiment any combination of the connecting structures may instead remain with the corresponding cores 52, cavities 60, 60', and lock ring 90, and hence be replaced therewith.

In accordance with the non-limiting embodiment the first connecting structure includes a turret 50 upon which a pair of the cores 52, 52' are arranged. Alternatively, the turret 50 may have a single core 52, or any number of additional cores 52'. The turret 50 is rotatably linked to the table 14 for sequentially swapping each core 52, 52' between the split cavities 60, 60'. Accordingly, the first connecting structure further includes a rotation structure for rotation of the turret 50. The rotation structure preferably includes a trunnion 54, as shown, configured between the turret 50 and a tower 56 that is mounted on the table 14. The trunnion 54 further includes a drive (not shown) for rotating the turret 50 to swap the cores 52, 52' between a molding orientation, registered between the split cavities 60, 60', and a de-molding orientation outside of the split cavities 60, 60', as shown with reference to the core 52' at mold 12C. The trunnion 54 also preferably includes a service coupling (not shown) for supplying one or more services, such as a coolant or air, to the turret 50. Other forms of the rotation structure will be apparent to those skilled in the art. The turret 50 also preferably includes a molded article ejection structure for ejection of the finished molded article (not shown) from the cores 52, 52'. The ejection structure preferably includes a collar 58 connected to an end of an annular piston (not shown) slidably disposed within the turret 50. A portion of the collar 58 defines an end portion of the molding cavity. Accordingly, the finished molded article (not shown) may be ejected from the core 52, 52' by movement of the collar 58 acting against an end portion thereof. The position of the annular piston (not shown) within the turret 50 is preferably controlled by fluid means (e.g. air or hydraulic). Additional, or alternative, ejection structure will be apparent to those skilled in the art including, for example, a pressurized fluid nozzle (not shown) formed on the core 52, 52', whereby a pressurized fluid being expelled from the nozzle (not shown) would bear against an inside surface of the molded article (not shown) and thereby force the molded article (not shown) from the core 52, 52'.

Each split cavity 60, 60', as shown, preferably includes half of the outer portion of the molding cavity. Preferably, the outer portion of the molding cavity is divided along a vertical plane that is aligned with a longitudinal axis of the molded article (not shown). The split cavities 60, 60' are movably linked to the table 14 by the second connecting structure to provide for a relative repositioning between a molding configuration, as shown with reference to the mold 12A, and a clearance configuration, as shown with reference to the molds 12C, 12D, & 12E. In accordance with the non-limiting embodiment the second connecting structure includes a pair of linkages 70 (shown in molds 12B and 12C but otherwise omitted for sake of revealing otherwise hidden mold structure) connected to a positioning drive 72 for movably linking the mold split cavities 60, 60' to the table 14. In the molding configuration the split cavities 60, 60' are arranged to register with one of the cores 52, 52' to envelop and trap the core 52, 52' therebetween. In the clearance configuration the split cavities 60, 60' are arranged to provide clearance for the rotational swapping of the core 52 therebetween.

Each lock ring 90 is configured to cooperate with the split cavities 60, 60' in locking them together, in the molding configuration, around the core 52, 52'. Preferably, the split cavity 60, 60' and the lock ring 90 include complementary tapers 62, 92 provided along conically tapered surfaces thereon. In accordance with the non-limiting embodiment the third connecting structure includes a linkage 74 connected to a positioning drive 76 for movably linking the lock ring 90 to the table 14 for a relative repositioning, away from the center of rotation of the table 14, with respect to the molding split cavities 60, 60' between a locked configuration, as shown with reference to the mold 12A, and an un-locked configuration, as shown with reference to the molds 12C, 12D, & 12E. In the locked configuration the lock ring 90 is positioned with its taper 92 engaged with the complementary taper 62 configured on the split cavities 60, 60'. In the un-locked configuration the lock ring 90 is retracted (in the direction of the centre of the table 14) to provide clearance for the split cavities 60, 60' to open to the clearance configuration. In accordance with the non-limiting embodiment the lock ring 90 is a mass-drive wherein a centrifugal force acting on the lock ring 90, when the table 14 is rotated, performs the molding function of mold clamping across the mating tapers 62, 92.

The foregoing positioning drives 72, 76 may include any type of known drive or actuator including, for example, a cam system, linear motor, pneumatic actuator, hydraulic actuator, and the like. Likewise, the linkages 70, 74 may also include any type of know linkage assembly including, for example, a linear block and bearing arrangement, for slidably supporting the split cavities 60, 60' and lock ring 90, respectively.

The hot runner 40 includes a branched array of heated melt conduits 42 extending from a hub-like sprue 44 to a plurality of shooting pots 80. The sprue 44 is configured to connect in fluid communication with a machine nozzle 8 of an extruder 4 for receiving a melt of molding material therefrom in a conventional manner. The plurality of shooting pots 80 are connected in fluid communication with the corresponding plurality of molds 12 for a controlled transfer of the melt of molding material thereto. A heating structure (not shown), such as resistance and/or induction type heaters are preferably provided to heat the melt conduits 42, the sprue 44, and the shooting pots 80. Alternative hot runner configurations (not shown) will be apparent to those skilled in the art including, for example, a smaller ratio of shooting pots 80 to molds 12 may be configured with at least one shooting pot 80 connected to more than one mold 12. A further example of a possible hot runner configuration includes a multi-material hot runner (not shown) having parallel sets of melt conduits and shooting pots for the formation of molded articles composed of multiple materials.

The extruder 4 may be any known variety of extruder including, for example, a single-stage extruder, a two-stage extruder, or a compounding extruder. The extruder 4 preferably includes a typical stuffer 6 for controllably pressurizing the melt of molding material within the melt conduits 42. The extruder is preferably positioned adjacent to the rotary molding machine 10, as shown. Alternative extruder arrangements (not shown) will be apparent to those skilled in the art including, for example, the extruder 4 mounted directly above or beneath (not shown) the rotary molding machine 10 in a concentric arrangement.

Each shooting pot 80 includes an elongate tubular nozzle 84. Preferably, each shooting pot 80 includes an injection structure such as a plunger 82 slidably disposed within the nozzle 84. The nozzle 84 includes an inlet connected to at least one of the melt conduits 42 and an outlet arranged in fluid communication with the mold 12 through an interface (not shown) defined between the mold split cavities 60, 60'. A check valve (not shown) is preferably arranged between the melt conduit 42 and the nozzle 84. The check valve is oriented to allow, during a step of recovery, the nozzle 84 to be re-charged with a shot volume of the melt of molding material from the melt conduit 42, and that, during a subsequent step of injection, a reverse flow from the nozzle 84 to the melt conduit 42 is prevented as the molding material in the nozzle 84 is injected into the mold 12. The recovery and injection of the molding material into and out of the nozzle 84 is controlled, at least in part, by the plunger 82. During recovery the plunger 82 is preferably forced to extend from a forward position (as positioned immediately after injection), as shown with reference to the mold 12A, to a retracted position (as positioned after having been re-charged with molding material), as shown with reference to the mold 12B, by a pressurized inflow of molding material from the melt conduit 42. Alternatively, the plunger 82 may be positioned in the retracted position prior to being refilled by the melt conduit 42. Alternative injection structures will be apparent to those skilled in the art including, for example, shooting pots 80 without plungers that instead rely on the controlled application of melt pressure from the stuffer 6.

The actuation of each plunger 82 of the plurality of shooting pots 80 is preferably performed sychnronously by a common shooting pot actuation structure. The actuation structure preferably includes a cam plate 30 rotatably mounted to the table 14 and a further drive (not shown) configured between the cam plate 30 and the table 14 for an oscillating rotation therebetween. The cam plate 30 defines a plurality of cam tracks 32. The actuation structure also preferably includes a linkage 88 that slidably links the plunger 82 to the table 14, for sliding movements along the longitudinal axis of the plunger 82. The axis of the plunger 82 is preferably aligned with a radial axis from the center of rotation of the table 14. A portion of each linkage 88 is configured to engage with the cam track 32 whereby rotational movement of the cam plate 30 will cause a sympathetic movement of each linkage 88 towards and away from the mold 12 (along the axis of the plunger 82). Another portion of each linkage 88 is configured to connect with a head portion 86 disposed at an end of the plunger 82. Accordingly, the foregoing actuation structure is configured to effect a synchronous reciprocation of the plungers 82 of all of the plurality of molds 12 by corresponding rotational movements of the cam plate 30. Alternative actuation structures will be apparent to those skilled in the art including, for example, those capable of partial or complete de-synchronous operation of the plungers 82 for partial or complete independent actuation of the plurality of shooting pots 80.

In accordance with an alternative non-limiting embodiment the actuation structure may include the head portion 86 as a mass-drive wherein a centrifugal force acting on the head portion 86, when the table 14 is rotated, drives the plunger 82 and thereby performs the molding function of melt injection.

In accordance with an injection molding process, the table 14, and with it the plurality of molds 12, the hot runner 40, and the cam plate 30, is preferably kept in constant rotation at a constant predefined angular velocity. The plurality of molds 12 are preferably operated in unison. For sake of illustrating the sequence of positions through which the plurality of mold 12 will transition, in unison, during a typical injection cycle, the molds 12A through 12G are shown out of phase with both each other and with the remaining molds 12. The following discussion of the injection molding cycle arbitrarily starts with the state of mold 12A as a reference position for the end of the previous injection molding cycle and the beginning of the next. The mold 12A is in a closed configuration having just completed a step of molding a molded article (not shown). Next, the mold 12B is arranged in a partially open configuration with the lock ring 90 in the un-locked configuration. Next, the mold 12C is arranged in an open configuration with the split cavities 60, 60' in the clearance configuration. Next, the mold 12D is arranged with the turret 50 at the start of swapping the cores 52, 52' between the molding and de-molding orientations. Next, the mold 12E is arranged with the turret 50 having completed the step of swapping the cores 52, 52' between the molding and de-molding orientations. Next, the mold 12F is arranged in a partially closed configuration with the split cavities 60, 60' in registration with the core 52' in the molding configuration. Next, the mold 12G is arranged in the closed configuration with the lock ring 90 once again registered in the locked configuration about the split cavities 60, 60'. Next, the shooting pots 80 are actuated, by rotation of the cam plate 30, for injecting the melt of molding material to fill the molding cavities defined in the remaining, unidentified, molds between mold 12G and 12A. During injection, a centrifugal force acting on the lock ring 90, in the direction of the split cavities 60, 60', generates a clamping force along the mating tapers 62, 92, for maintaining the mold split cavity in the locked configuration thereby resisting the melt pressure inside the molding cavity that might otherwise cause the split cavities 60, 60' and core 52, 52' to separate. Optionally, the shooting pots 80 continue to apply a holding pressure to the molding material in the molding cavities as the newly formed molded articles (not shown) begin to be cooled within the molds 12 in the closed configuration. Last, the newly formed molded articles (not shown) are further subjected to in-mold cooling in the closed configuration. The injection molding cycle then re-cycles.

The overall injection molding process further includes a shooting pot recovery sub-process that is preferably performed contemporaneously with to the foregoing steps between mold 12A and mold 12G, that is while the molds are undergoing the steps of mold opening, core swapping, and mold closing, such that the shooting pots 80 are primed to inject into the mold 12G upon the locking thereof. The shooting pot recovery process includes the steps of transferring the melt of molding material from the extruder 4 through the hot runner 40 and into the shooting pots 80 under a transfer pressure generated by the stuffer 6.

The overall injection molding process further includes a post-mold sub-process that is preferably performed contemporaneous to the foregoing steps between mold 12G and mold 12A, that is while the molds are undergoing injection, hold, and in-mold cooling. The post-mold sub-process includes the steps of further cooling of the molded article (not shown) on the core 52 in the de-molding orientation, followed by the de-molding thereof from the core 52 by the actuation of the collar 58, whereby the molded article (not shown) may be retrieved by a post-molding device (not shown) or simply ejected onto a conveyor (not shown) that encircles the molding machine 10.

Naturally, other variations in the rotary injection molding machine and processes are also possible and will become apparent to those of skill in the art having regard to the teachings presented herein. For example, it is possible that the angular velocity of the table 14 be varied during the injection molding cycle wherein the angular velocity is increased during the steps of injection and hold to provide an optimal clamping force, and decreased during mold open during the steps of mold opening, core swapping, and mold closing, to make it easier to reposition the lock ring 90 (i.e. period of reduced centrifugal force). A further example of a possible process variation includes de-synchronized mold operation wherein the plurality of molds 12 are operated out of phase, at least in part. Yet another example of a possible process variation includes a process of operating a plurality of hot runners (not shown) for performing a multi-material molding process.

The description of the non-limiting exemplary embodiments provide examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A rotary molding machine comprising:
a frame;
a table rotatably mounted to the frame;
a first drive for rotation of the table relative to the frame;
the table configured to receive a plurality of molds mounted in a circular array thereon;
a hot runner mounted to the table configured to connect the plurality of molds to an extruder;
a mass-drive movably linked to the table for freedom of movement away from the center of rotation of the table;
the mass-drive configured to drive a molding function responsive to a centrifugal force directed away from a center of rotation of the table.

2. The rotary molding machine according to claim 1 wherein:
the mass-drive configured to perform the molding function of mold clamping.

3. The rotary molding machine according to claim 1, wherein:
the mass-drive configured to perform the molding function of melt injection.

4. The rotary molding machine according to claim 1, wherein:
the table includes:
a plurality of first connecting structures mounted in a circular array thereon for mounting the plurality of molds to the table, at least in part.

5. The rotary molding machine according to claim 4, wherein:
each of the first connecting structures configured to receive a core of the corresponding mold, the core configured to define an inner portion of a molding cavity.

6. The rotary molding machine according to claim 5, wherein:
each of the first connecting structures configured to position the core between a molding orientation, registered between a pair of split cavities of the mold, and a de-molding orientation outside of the split cavities.

7. The rotary molding machine according to claim 6, wherein:
each of the first connecting structure includes:
a turret;
a rotation structure for rotatably linking the turret to the table;
the turret configured to receive the core.

8. The rotary molding machine according to claim 7, wherein:
the turret configured to receive a plurality of cores.

9. The rotary molding machine according to claim 7, wherein:
the rotation structure includes:
a tower mounted on the table;
a trunnion configured between the turret and a tower;
a drive for rotating the turret.

10. The rotary molding machine according to claim 9, wherein:
the rotation structure further includes a service coupling for supplying a service to the turret.

11. The rotary molding machine according to claim 7, wherein:
at least one of the turret and the core includes:
an ejection structure configured to eject a molded article from the core.

12. The rotary molding machine according to claim 11, wherein:
the ejection structure includes:
an annular piston slidably disposed within the turret;
a collar configured to define an end portion of the molding cavity;
the annular piston linked with the collar.

13. The rotary molding machine according to claim 11, wherein:
the ejection structure includes:
a pressurized fluid nozzle configured on the core.

14. The rotary molding machine according to claim 1, wherein:
the table includes:
a plurality of second connecting structures mounted in a circular array thereon for mounting the plurality of molds to the table, at least in part.

15. The rotary molding machine according to claim 14, wherein:
each of the second connecting structures configured to receive a pair of split cavities of the corresponding mold, the pair of split cavities together defining an outer portion of the molding cavity.

16. The rotary molding machine according to claim 15, wherein:
each of the second connecting structures configured to provide for a relative repositioning of the split cavities between a molding configuration and a clearance configuration.

17. The rotary molding machine according to claim 15, wherein:
each of the second connecting structures includes:
a positioning drive connected to the table;
a pair of linkages configured to connect corresponding split cavities of the pair of split cavities to the positioning drive.

18. The rotary molding machine according to claim 15, wherein:
the pair of split cavities configured to register with the core.

19. The rotary molding machine according to claim 15, wherein:
the pair of split cavities configured to cooperate with a lock ring to lock the pair of split cavities together around the core.

20. The rotary molding machine according to claim 19, wherein:
the split cavity and the lock ring include complementary tapers.

21. The rotary molding machine according to claim 1, wherein:
the table includes:
a plurality of third connecting structures mounted in a circular array thereon for mounting the plurality of molds to the table, at least in part.

22. The rotary molding machine according to claim 21, wherein:
each of the third connecting structures configured to receive a lock ring of the corresponding mold.

23. The rotary molding machine according to claim 22, wherein:
each of the third connecting structures configured to provide for a repositioning of the lock ring relative to a pair of spit cavities of the corresponding mold between a locked configuration and an un-locked configuration.

24. The rotary molding machine according to claim 23, wherein:
the lock ring configured to cooperate with the pair of split cavities to lock the pair of split cavities together around a core.

25. The rotary molding machine according to claim 24, wherein:
the lock ring and the split cavity include complementary tapers.

26. The rotary molding machine according to claim 22, wherein:
each of the third connecting structures includes:
a positioning drive connected to the table;
a linkage configured to connect the lock ring to the positioning drive.

27. The rotary molding machine according to claim 24, wherein:
the mass-drive provided by the lock ring and wherein the lock ring configured to clamp the pair of split cavities around the core.

28. The rotary molding machine according to claim 1, further including:
an ejection structure for ejecting a molded article from the plurality of molds.

29. The rotary molding machine according to claim 1, wherein:
the hot runner includes:
a plurality of melt conduits arranged in a branched array;
a sprue configured to connect in fluid communication with the melt conduits and the extruder;
a plurality of shooting pots configured to connect in fluid communication with the melt conduits and with the plurality of molds;
a heating structure for heating the melt conduits, the sprue, and the shooting pots.

30. The rotary molding machine according to claim 29, wherein:
each of the plurality of shooting pot includes:
an elongate tubular nozzle;
a plunger slidably disposed within the nozzle;
the nozzle defining an inlet connected to at least one of the melt conduits, and an outlet arranged in fluid communication with the corresponding mold.

31. The rotary molding machine according to claim 30, wherein:
each shooting pot further includes:
a check valve arranged between the melt conduit and the nozzle;
the check valve oriented to allow one-way flow from the melt conduits to the nozzle.

32. The rotary molding machine according to claim 30, further including:
a shooting pot actuation structure connected to the plunger for moving the plunger within the nozzle.

33. The rotary molding machine according to claim 32, wherein:
an axis of the plunger aligned with a radius of the table;
the shooting pot actuation structure includes:
a head portion disposed at an end of the plunger;
the mass-drive provided by the head portion and wherein the head portion configured to drive the molding function of melt injection.

34. The rotary molding machine according to claim 32, wherein:
the shooting pot actuation structure includes:
a cam plate rotatably mounted to the table;

a second drive configured between the cam plate and the table for a relative oscillating rotation therebetween;
the cam plate defines a plurality of cam tracks;
a plurality of linkages slidably connected to the table for sliding movements along the longitudinal axis of the plungers;
a portion of each linkage configured to engage with the cam track;
a further portion of each linkage configured to connect with a head portion of the plunger;
whereby a reciprocation of the plungers of the plurality of molds provided by the relative oscillating rotation between the cam plate and the table.

35. A mold for mounting on a rotatable table of a rotary molding machine, the mold comprising:
complementary molding structures that cooperatively define a molding cavity within which a molded article may be formed;
a mass-drive slidably mountable on the table with freedom of movement away from the center of rotation of the table;
the mass-drive configured to drive a molding function responsive to a centrifugal force directed away from the center of rotation of the table.

36. The mold according to claim 35, wherein:
the complementary molding structures includes:
a core configured to define an inner portion of the molding cavity; and
a pair of split cavities together defining an outer portion of the molding cavity; and
the mold further includes:
a lock ring configured to cooperate with the pair of split cavities to lock the pair of split cavities together around the core;
the lock ring providing the mass-drive to clamp the pair of split cavities around the core.

37. The mold according to claim 35, further includes:
a first connecting structure for mounting the mold, at least in part, to the table.

38. The mold according to claim 37, wherein:
the first connecting structure configured to receive the core.

39. The mold according to claim 37, wherein:
the first connecting structure includes:
a turret;
a rotation structure for rotatably linking the turret to the table;
the turret configured to receive the core.

40. The mold according to claim 39, wherein:
the turret configured to receive a plurality of cores.

41. The mold according to claim 40, wherein:
the rotation structure includes:
a tower mountable on the table;
a trunnion configured between the turret and a tower;
a drive for rotating the turret.

42. The mold according to claim 41, wherein:
the rotation structure further includes a service coupling for supplying a service to the turret.

43. The mold according to claim 39, wherein:
at least one of the turret and the core includes:
an ejection structure configured to eject a molded article from the core.

44. The mold according to claim 43, wherein:
the ejection structure includes:
an annular piston slidably disposed within the turret;
a collar configured to define an end portion of the molding cavity;
the annular piston linked with the collar.

45. The mold according to claim 43, wherein:
the ejection structure includes:
a pressurized fluid nozzle configured on the core.

46. The mold according to claim 35, further including:
a second connecting structure for mounting the mold, at least in part, to the table.

47. The mold according to claim 46, wherein:
the second connecting structure configured to receive the pair of split cavities.

48. The mold according to claim 35, wherein:
the second connecting structure configured to provide for a relative repositioning of the split cavities between a molding configuration and a clearance configuration.

49. The mold according to claim 46, wherein:
the second connecting structure includes:
a positioning drive connectable to the table;
a pair of linkages configured to connect corresponding split cavities of the pair of split cavities to the positioning drive.

50. The mold according to claim 35, wherein:
the split cavity and the lock ring include complementary tapers.

51. The mold according to claim 35, wherein:
a third connecting structure for mounting the mold, at least in part, to the table.

52. The mold according to claim 51, wherein:
the third connecting structure configured to receive the lock ring.

53. The mold according to claim 52, wherein:
the third connecting structure configured to provide for a repositioning of the lock ring relative to the pair of spit cavities between a locked configuration and an un-locked configuration.

54. The mold according to claim 53, wherein:
the third connecting structure includes:
a positioning drive connectable to the table;
a linkage configured to connect the lock ring to the positioning drive.

55. A mass-drive for a rotary molding machine, the mass-drive comprising:
a body movably linked to a table of the rotary molding machine for freedom of movement away from a center of rotation of the table;
the body configured to drive a molding function responsive to a centrifugal force directed away from the center of rotation of the table.

56. The mass-drive according to claim 55, wherein:
the body configured to perform at least one of the molding function of:
mold closing;
mold clamping;
melt injection;
mold opening;
molded article ejection.

57. The mass-drive according to claim 55, wherein:
the body defines a lock ring and wherein the lock ring configured to clamp a molding structure including a pair of split cavities around a core.

58. The mass-drive according to claim 57, wherein:
the lock ring configured to cooperate with a third connecting structure for linking the body to the table.

59. The mass-drive according to claim 58, wherein:
the third connecting structure configured to provide for a repositioning of the lock ring relative to a pair of spit cavities of the corresponding mold between a locked configuration and an un-locked configuration.

60. The mass-drive according to claim 59, wherein:
the lock ring and the split cavity include complementary tapers.

61. The mass-drive according to claim 55, wherein:
the body defines a head portion of a plunger and wherein the plunger configured to cooperate with a nozzle of a shooting pot.

62. A method of molding a molded article with the rotary molding machine according to claim 1, the method comprising:
rotating the table with the plurality of molds thereon;
performing a first molding function of closing at least one of the plurality of molds;
performing a second molding function of clamping at least one of the plurality of molds;
performing a third molding function of injecting a melt into a molding cavity defined in at least one of the plurality of molds;
performing a fourth molding function of opening of at least one of the plurality of molds;
performing a fifth molding function of ejecting of a molded article from at least one of the plurality of molds;
the performing of at least one of the molding functions is with a mass-drive responsive to a centrifugal force directed away from a center of rotation of the table.

63. The method of claim 62, further including:
positioning a lock ring, of the mold, between a locked and an un-locked configuration.

64. The method of claim 63, further including:
performing the molding function of clamping using the lock ring as the mass-drive.

65. The method of claim 62, further including:
positioning a pair of split cavities, of the mold, between a molding configuration and a clearance configuration.

66. The method of claim 62, further including:
swapping a pair of cores, of the mold, between a molding orientation and a de-molding orientation.

67. The method of claim 62, further including:
retrieving of the ejected molded article with a post-molding device.

68. The method of claim 62, further including:
rotating the table at a constant predefined angular velocity.

69. The method of claim 62, further including:
rotating the table at a varying angular velocity.

70. The method of claim 69, further including:
increasing the angular velocity of the table during melt injection and decreasing the angular velocity of the table during mold open.

71. The method of claim 62, further including:
synchronizing operation of the plurality of molds.

72. The method of claim 62, further including:
desynchronizing operation of the plurality of molds.

* * * * *